United States Patent
Hu et al.

(10) Patent No.: US 10,652,010 B2
(45) Date of Patent: May 12, 2020

(54) FULLY HOMOMORPHIC ENCRYPTED CIPHERTEXT QUERY METHOD AND SYSTEM

(71) Applicants: Shenzhen FHE technologies Co., Ltd, Shenzhen (CN); Heping Hu, Shenzhen (CN)

(72) Inventors: Heping Hu, Shenzhen (CN); Wei Hu, Shenzhen (CN)

(73) Assignees: SHENZHEN FHE TECHNOLOGIES CO., LTD, Shenzhen (CN); HEPING HU, Shenzhen (CN)

( * ) Notice: Subject to any disclaimer, the term of this patent is extended or adjusted under 35 U.S.C. 154(b) by 66 days.

(21) Appl. No.: 16/120,443

(22) Filed: Sep. 3, 2018

(65) Prior Publication Data

US 2018/0367294 A1 Dec. 20, 2018

Related U.S. Application Data

(63) Continuation-in-part of application No. PCT/CN2017/112472, filed on Nov. 23, 2017.

(30) Foreign Application Priority Data

May 9, 2017 (CN) .......................... 2017 1 0320825

(51) Int. Cl.
*H04L 9/00* (2006.01)
*G06F 21/62* (2013.01)

(52) U.S. Cl.
CPC .......... *H04L 9/008* (2013.01); *G06F 21/6227* (2013.01)

(58) Field of Classification Search
CPC ..... H04L 9/008; G06F 21/6227; G06F 21/602
USPC .......................................................... 380/28
See application file for complete search history.

(56) References Cited

U.S. PATENT DOCUMENTS

| | | | | |
|---|---|---|---|---|
| 8,855,317 B2* | 10/2014 | Rong | .................. | G06F 21/6218 380/278 |
| 9,461,974 B2* | 10/2016 | Rohloff | .............. | H04L 63/0471 |
| 10,320,752 B2* | 6/2019 | Hardy | ................. | G06F 21/6254 |
| 2008/0212780 A1* | 9/2008 | Lemma | ................. | G10L 19/018 380/277 |
| 2010/0329448 A1* | 12/2010 | Rane | ....................... | H04L 9/008 380/28 |

(Continued)

*Primary Examiner* — Teshome Hailu
(74) *Attorney, Agent, or Firm* — Matthias Scholl P.C.; Matthias Scholl (57) ABSTRACT

A fully homomorphic encrypted ciphertext query method, the method including: acquiring a first plaintext, encrypting the first plaintext using a symmetric-key algorithm or a public-key algorithm to yield a first ciphertext, and storing the first ciphertext as a queried object; receiving a second plaintext which corresponds to a query condition, encrypting the second plaintext using a symmetric-key algorithm or a public-key algorithm to yield a second ciphertext, and storing the second ciphertext as a query object; performing bitwise summation on the queried object and the query object, to acquire a ciphertext query result; and decrypting the ciphertext query result to yield a decrypted plaintext, and comparing the decrypted plaintext with the second plaintext, determining, if the decrypted plaintext is the same as the second plaintext, the ciphertext query result is correct, and the query object exists in the queried object; otherwise, determining the ciphertext query result is incorrect.

15 Claims, 2 Drawing Sheets

(56) References Cited

U.S. PATENT DOCUMENTS

2015/0249650 A1\* 9/2015 Rohloff ............... H04L 63/0471
713/153

\* cited by examiner

FULLY HOMOMORPHIC ENCRYPTED CIPHERTEXT QUERY METHOD AND SYSTEM

CROSS-REFERENCE TO RELAYED APPLICATIONS

This application is a continuation-in-part of International Patent Application No. PCT/CN2017/112472 with an international filing date of Nov. 23, 2017, designating the United States, now pending, and further claims foreign priority benefits to Chinese Patent Application No. 201710320825.5 filed May 9, 2017. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to the field of information security, and more particularly, to a fully homomorphic encrypted ciphertext query method and system.

Ciphertext query has been widely used in the field of full-text retrieval to acquire retrieved results of keywords.

Conventional ciphertext query method mainly uses a symmetric-key algorithm and a public-key algorithm. However, both the symmetric-key algorithm and the public-key algorithm face the problem of information leakage.

SUMMARY

The disclosure provides a fully homomorphic encrypted ciphertext query method and system that can prevent information leakage in the query process.

Disclosed is a fully homomorphic encrypted ciphertext query method consisting of the following steps:
(1) acquiring a first plaintext, encrypting the first plaintext using a symmetric-key algorithm or a public-key algorithm to yield a first ciphertext, and storing the first ciphertext as a queried object;
(2) receiving a second plaintext which corresponds to a query condition, encrypting the second plaintext using a symmetric-key algorithm or a public-key algorithm to yield a second ciphertext, and storing the second ciphertext as a query object;
(3) performing bitwise summation on the queried object acquired in (1) and the query object acquired in (2) according to a numeral system thereof, to acquire a ciphertext query result; and
(4) decrypting the ciphertext query result acquired in (3) to yield a decrypted plaintext and comparing the decrypted plaintext with the second plaintext in (2); determining if the decrypted plaintext is the same as the second plaintext and the ciphertext query result is correct, in which case the query object exists in the queried object; and determining if the ciphertext query result is incorrect, in which case the query object does not exist in the queried object.

Also disclosed is a fully homomorphic encrypted ciphertext query method consisting of the following steps:
(1) acquiring a first plaintext, encrypting the first plaintext using a symmetric-key algorithm or a public-key algorithm to yield a first ciphertext, and storing the first ciphertext as a queried object;
(2) receiving a second plaintext which corresponds to a query condition, encrypting the second plaintext using a symmetric-key algorithm or public-key algorithm to yield a second ciphertext, and storing the second ciphertext as a query object;
(3) performing bitwise subtraction on the queried object acquired in (1) and the query object acquired in (2) according to a numeral system thereof to yield a difference, and using the difference as a ciphertext query result; and
(4) decrypting the ciphertext query result acquired in (3) to yield a decrypted plaintext, and determining whether the decrypted plaintext is equal to zero. If the plaintext is equal to zero, it indicates that the ciphertext query result is correct, and the query object exists in the queried object; otherwise, it indicates that the ciphertext query result is incorrect, and the query object does not exist in the queried object.

(1) can comprise:
(1-1) acquiring the first plaintext, and converting the first plaintext into a third plaintext conforming to the numeral system; and
(1-2) encrypting each digit of the third plaintext of the numeral system acquired in (1-1) to yield a first ciphertext combination, and storing the first ciphertext combination as the queried object.

(2) can comprise:
(2-1) acquiring the second plaintext corresponding to the query condition, and converting the second plaintext into a fourth plaintext conforming to the numeral system; and
(2-2) encrypting each digit of the fourth plaintext of the numeral system acquired in (2-1) to yield a second ciphertext combination, and storing the second ciphertext combination as the query object.

Converting the first/second plaintext into the third/fourth plaintext conforming to the numeral system can comprise converting the first/second plaintext of a character type into a character encoding and converting the character encoding into the third/fourth plaintext conforming to the numeral system.

When the symmetric-key algorithm is employed, the following formula can be used:

$$c=(m+s*r+p*q) \bmod x_0$$

where c denotes a ciphertext, m denotes a digit of a plaintext conforming to a numeral system, s denotes a base of the numeral system, r denotes a random number, p denotes an encryption key, and $x_0$ denotes an intermediate variable equal to a product of the encryption key p and another encryption key q, in which both p and q are odd numbers, and the encryption keys are not publicly disclosed.

When the public-key algorithm is employed, the following formula can be used:

$$c=(m+s*r+s*\Sigma_1^\tau x_i*r) \bmod x_0$$

where c denotes a ciphertext, m denotes a digit of a plaintext conforming to a numeral system, s denotes a base of the numeral system, both r and τ denote random numbers, $x_i$ denotes a randomly generated ith, $x_i=q_i*p+s*r$, p denotes a private key used in the public-key algorithm, which is an odd number, and $q_i \ll q_0$, $0 \le i \le \tau$, and a public key used in the public-key algorithm is $pk=(x_0, x_1, \ldots, x_i, \ldots, x_\tau)$.

The private key p can be generated based on Learning With Errors (LWE), a lattice, or Approximate Greatest Common Divisor (GCD) and sparse subset sum.

(3) can comprise: sequentially extracting the same number of ciphertexts as those in the query object from the queried object, performing bitwise summation on the queried object and the query object according to the numeral system until a number of ciphertexts in the queried object is smaller than a number of ciphertexts in the query object to yield a plurality of summation results, and employing the plurality of summation results as the ciphertext query result.

(4) can comprise: decrypting the plurality of ciphertext query results to yield the decrypted digits, converting the decrypted digits into a numeral system plaintext, then converting the numeral system plaintext into a corresponding character encoding, and comparing the acquired character encoding with the second plaintext as the query condition. If the acquired character encoding and the second plaintext are the same, it indicates that the query result is true; otherwise it indicates that the query result is false.

The decryption operation formula of the ciphertext query result acquired by bitwise summation can be:

$$((c \bmod p) \bmod y)/2,$$

where $y \geq s*2-1$, and $y \leq p/2$.

The decryption operation formula of the ciphertext query result acquired by bitwise subtraction can be:

$$(c \bmod p) \bmod s.$$

The character encoding can be ASCII encoding or Unicode encoding.

According to another aspect of the disclosure, a fully homomorphic encrypted ciphertext query system is provided, comprising:

a first module configured to acquire a first plaintext of any data type, encrypt the first plaintext using a symmetric-key algorithm or a public-key algorithm to yield a first ciphertext, and store the first ciphertext as a queried object;

a second module configured to receive a second plaintext which corresponds to a query condition, encrypt the second plaintext using a symmetric-key algorithm or a public-key algorithm to yield a second ciphertext, and store the second ciphertext as a query object;

a third module configured to perform bitwise summation on the queried object acquired by the first module and the query object acquired by the second module—according to a numeral system thereof—to acquire a ciphertext query result; and a fourth module configured to decrypt the ciphertext query result acquired by the third module to yield a decrypted plaintext, compare the decrypted plaintext with the second plaintext acquired by the second module, and determine if the decrypted plaintext is the same as the second plaintext, in which case the ciphertext query result is correct, and the query object exists in the queried object; otherwise, if the ciphertext query result is incorrect, then the query object does not exist in the queried object.

According to another aspect of the disclosure, a fully homomorphic encrypted ciphertext query system is provided, comprising:

a first module configured to acquire a first plaintext of any data type, encrypt the first plaintext using a symmetric-key algorithm or a public-key algorithm to yield a first ciphertext, and store the first ciphertext as a queried object;

a second module configured to receive a second plaintext which corresponds to a query condition, encrypt the second plaintext using a symmetric-key algorithm or a public-key algorithm to yield a second ciphertext, and store the second ciphertext as a query object;

a third module configured to perform bitwise subtraction on the queried object acquired by the first module and the query object acquired by the second module—according to a numeral system thereof—to yield a difference, and use the difference as a ciphertext query result; and a fourth module configured to decrypt the ciphertext query result acquired by the third module to yield a decrypted plaintext, and determine whether the decrypted plaintext is equal to zero. If the plaintext is equal to zero, it indicates that the ciphertext query result is correct, and the query object exists in the queried object; otherwise, it indicates that the ciphertext query result is incorrect, and the query object does not exist in the queried object.

A fully homomorphic encrypted circuit for implementing the aforesaid method consists of the following: an input data register, a command register, a status register, a cryptographic operation circuit, a logic control circuit, an output data register, and a data storage area RAM.

The input data register is configured to acquire the processed data and private data, transmit the processed data to the cryptographic operation circuit, and store the private data in the data storage area RAM for use by the cryptographic operation circuit;

the cryptographic operation circuit is configured to acquire the private data from the data storage area RAM;

the command register is configured to acquire a user command from a local bus and transmit the user command to the logic control circuit;

the logic control circuit is configured to control the cryptographic operation circuit to execute the encryption and decryption function and the ciphertext operation function of the data according to the user command, then transmit the result of execution to the status register, and the random number used in the encryption process is generated by a random number generator;

the status register is configured to acquire the result of execution from the logic control circuit and communicate the result of execution to an interface circuit via the local bus;

the data storage area RAM is configured to communicate the data processed by the cryptographic operation circuit to the output data register; and the output data register is configured to receive the data from the data storage area RAM and transmits the data to the local bus.

Advantages of the fully homomorphic encrypted ciphertext query method are summarized as follows.

(1) The method can solve the information leakage in the conventional ciphertext query method based on the symmetric-key algorithm; since the ciphertext contents acquired by encrypting the same contents using the same key in the query method are different, there is no information leakage problem.

(2) The disclosure can solve the existing technical problem that data may be leaked during the query process of the ciphertext query method based on the public-key algorithm, since the query method according to the disclosure only performs a bitwise summation operation on the ciphertext to acquire the ciphertext query result, and the ciphertext is always engaged in the operation in the query process, there is no data leakage problem.

(3) The method only performs a ciphertext bitwise summation operation in the ciphertext query process to acquire the ciphertext query result, and it exhibits high query efficiency.

(4) The method can determine the correctness of the query result only by one decryption process, so it is easy to implement.

(5) The ciphertext query process of the disclosure is completely performed in the ciphertext state, which can ensure that no data is leaked during the query process. The user with the query authority and the decryption authority can view the result data of the query by performing the decrypting operation on the ciphertext query result, improving the data security in the ciphertext query process.

DETAILED DESCRIPTION

For further illustrating, experiments detailing a fully homomorphic encrypted ciphertext query method are described below. It should be noted that the following examples are intended to describe and not to limit the disclosure.

First, the terms and technical terms used in the disclosure are explained.

System digit: according to the number of bits determined by the system, for example: binary is 1 bit, octal is 3 bits, hexadecimal is 4 bits, duotricemary notation is 5 bits, base64 is 6 bits, and base128 is 7 bits.

Values of numeral system: a value in the current numeral system. For example, a possible range of binary carry values is $\{0,1\}$; and a possible range of octal carry values is $\{0,1,2,3,4,5,6,7\}$.

The disclosure adopts a fully homomorphic encrypted ciphertext query method. The fully homomorphic encryption algorithm is first used to encrypt and store the plaintext data as the queried object. If the user wants to query the content stored in the ciphertext, the user only needs to input the plaintext query condition. The system encrypts the plaintext condition into a ciphertext using the fully homomorphic encryption algorithm as a query object. Then, the queried object and the query object are subjected to bitwise summation according to the ciphertext to acquire the ciphertext query result. The query result is still a ciphertext. The ciphertext query result can only be viewed by the user with the query authority and the decryption authority. The system implements the functions of like, equal (=), and unequal (< >) operations of the ciphertext query.

A fully homomorphic encrypted ciphertext query method comprises data representation, key generation, encryption algorithm, decryption algorithm, and Ciphertext Operation (CO).

The data representation: the type of the plaintext m is denoted as T, and the set of T is denoted as {Integer, Real, Character, Date, Boolean}, etc., and the plaintext ms is known as $m_s$, where s represents the data system (i.e., binary, decimal, base521, etc.) denoted as $(T, m_s)$; for example, s=2 represents binary, binary is usually denoted as B, and plaintext m is denoted as binary $m_B$, denoted as $(T, m_B)$; s=16 represents hexadecimal, hexadecimal usually denoted by H, and plaintext m represents hexadecimal digit $m_H$, denoted as $(T, m_H)$; s=512 represents base512, and plaintext m is denoted as base512 $m_{512}$, denoted as $(T, m_{512})$, and so on.

Key generation (KeyGen): a large odd number p is selected, and $x_0=q_0*p+s*r$ is calculated. $x_0$ must be an odd number; otherwise, it is recalculated. τ numbers are randomly generated, and $x_i=q_i*p+s*r$ is calculated, where $0 \le i \le \tau$, $q_i \ll q_0$, and r is a random number. The public key used for the public-key algorithm is $pk=(x_0, x_1, \ldots, x_i, \ldots x_\tau)$, the private key is p; the key used for the symmetric algorithm is $(x_0, p)$. A working key $W_{key}$ (pk, p) is introduced to clearly express the algorithmic description of the encryption, decryption, and ciphertext calculation.

Encryption algorithm (Enc): The working key $W_{key}$ generated by KeyGen is encrypted for any number m. m is converted to binary $m_B$ denoted as B, $B=(b_1, b_2, \ldots, b_i, \ldots, b_n)$, $b_i \in \{0,1\}$, $1 \le i \le n$, $c=\text{Enc}(W_{key}, B)$, c uses the encryption algorithm f to obtain $c=(c_1, c_2, \ldots, c_i, \ldots c_n)$, and $c_i=f(W_{key}, b)=b_i+s*r+s*\Sigma_1^\tau x_i*r \bmod x_0$, where r is a random number.

Decryption algorithm (Dec): The working key $W_{key}$ generated by KeyGen is used for the input ciphertext data c, $b'=\text{Dec}(W_{key}, c_i)$, b' uses the decryption algorithm f' to obtain $b'=(b_1', b_2', \ldots, b_i', \ldots, b_n')$, where $b'=f'(W_{key}, c_i)=(c_i \bmod p) \bmod s*2)/2$, $1 \le i \le n$, and b' of the base s is converted into plaintext m.

Ciphertext query (CQ): the work key $W_{key}$ is generated by KeyGen, for the input two ciphertext data $c_1$ and $c_2$, where $c_1$ is a queried object, $c_2$ is a query object, $c'=\text{CQ}(W_{key}, c_1 \text{ O } c_2)$, c' is the bitwise summation of the ciphertext encrypted according to the numeral system using the ciphertext query function f'', and the ciphertext query result $c'=(c_1', c_2', \ldots, c_i', \ldots, c_n')$ is acquired.

$$C_i'=f'(W_{key}, c_{1i}' O c_{2i}')$$

Where: $1 \le i \le n$, $O \in \{\text{like}, =, <>\}$

The ciphertext query function f'' is used to implement a ciphertext query. The ciphertext query process is to perform the bitwise summation of the ciphertext encrypted according to the numeral system on the queried object and the query object. The result of the addition is the ciphertext query result. The user with the query authority and the authority of decrypting the ciphertext query result data decrypts the ciphertext query result and compares it with the plaintext of the input query condition. If they are equal to each other, it indicates that the query result is "true;" that is, the ciphertext query result data can be viewed; otherwise, the query result is "false;" that is, the ciphertext query result data cannot be viewed.

Figure 1:
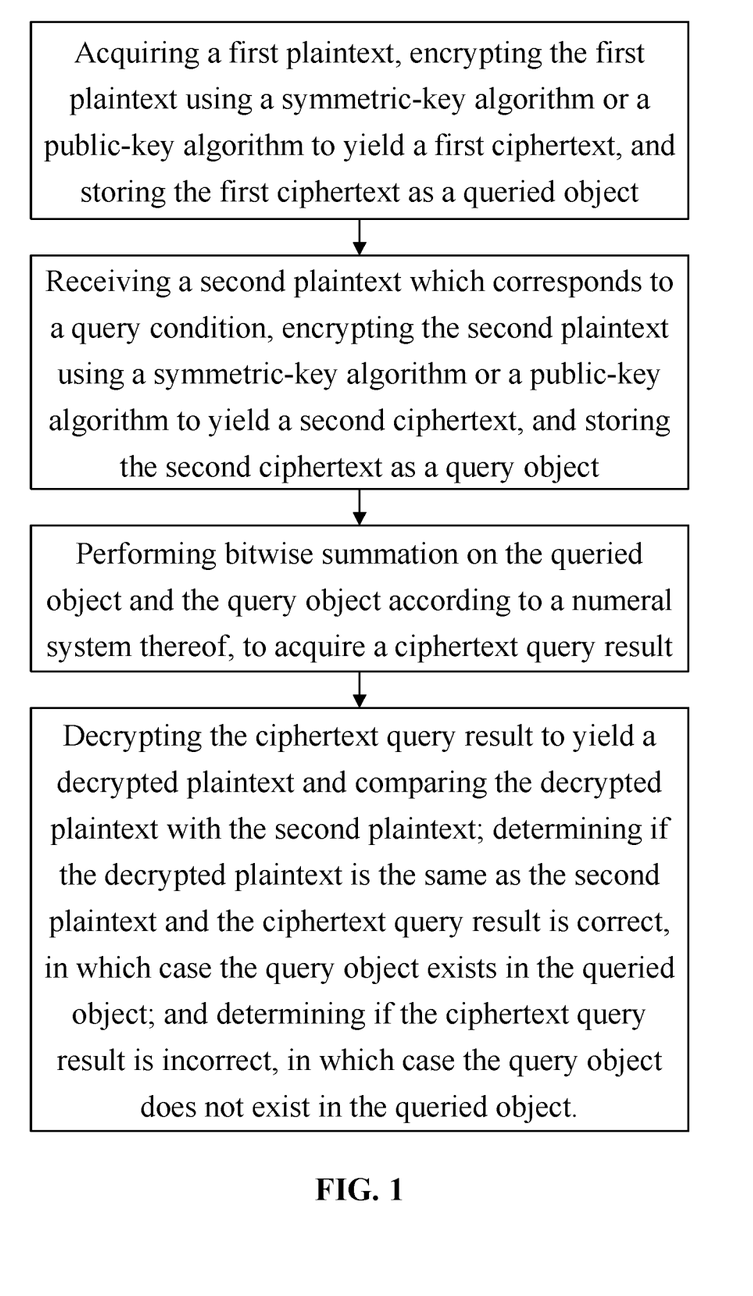
FIG. 1 is a flow diagram illustrating a fully homomorphic encrypted ciphertext query method as described herein.

As shown in FIG. 1, the fully homomorphic encrypted ciphertext query method of the disclosure comprises the following steps.

(1) Acquiring a first plaintext, encrypting the first plaintext using a symmetric-key algorithm or a public-key algorithm to yield a first ciphertext, and storing the first ciphertext as a queried object.

When the encryption operation uses a symmetric-key algorithm, the following formula is used specifically:

$$c=(m+s*r+p*q) \bmod x_0$$

Where c denotes a ciphertext, m denotes a digit of a plaintext conforming to a numeral system, s denotes a base of the numeral system, r denotes a random number, p denotes an encryption key, and $x_0$ denotes an intermediate variable equal to a product of the encryption key p and another encryption key q, in which both p and q are odd numbers, and the encryption keys are not publicly disclosed.

When the encryption operation uses a public-key algorithm, the following formula is used specifically:

$$c=(m+s*r+s*\Sigma_1^\tau x_i*r) \bmod x_0$$

Where c denotes a ciphertext, m denotes a digit of a plaintext conforming to a numeral system, s denotes a base of the numeral system, both r and τ denote random numbers, $x_i$ denotes a randomly generated ith, $x_i=q_i* p+s*r$, p denotes a private key used in the public-key algorithm, which is an odd number, $q_i \ll q_0$, $0<i<\tau$, and a public key used in the public-key algorithm is $pk=(x_0, x_1, \ldots, x_i, \ldots, x_\tau)$.

The private key p is generated based on Learning With Errors (LWE), a lattice, or Approximate Greatest Common Divisor (GCD) and sparse subset sum problem (SSSP).

This step comprises the following sub-steps.

(1-1) Acquiring the first plaintext and converting the first plaintext into a third plaintext conforming to the numeral system.

The process of converting the first plaintext into the third plaintext conforming to the numeral system comprises: converting the first plaintext of a character type into a character encoding (the character encoding may be ASCII encoding or Unicode encoding), and converting the character encoding into the third plaintext conforming to the numeral system.

For example, for the plaintext m='abdabd' of the character type, first, the plaintext of the character type is converted into an American Standard Code for Information Interchange (simply referred to as ASCII code); that is, a=97, b=98, d=100. Then, the ASCII code is converted into a binary bit plaintext; that is, a=97=(1100001), b=98=(1100010), d=100=(1100100).

(1-2) Encrypting each digit of the fourth plaintext of the numeral system acquired in (2-1) to yield a second ciphertext combination and storing the second ciphertext combination as the query object.

Specifically, the encryption operation in this step uses the following formula:

$$c=(m+s*r+p*q) \bmod x_0$$

Where c denotes a ciphertext, m denotes a digit of a plaintext conforming to a numeral system, s denotes a base of the numeral system (such as for binary, s=2; for hexadecimal, s=16), r denotes a random number, p denotes an encryption key, and $x_0$ denotes an intermediate variable equal to the product of the encryption key p and another encryption key q—in which both p and q are odd numbers, and the encryption keys are not publicly disclosed.

The binary s=2 is exemplified as follows.

For example, assuming that the work key p=111, q=11, $x_0=p*q=1221$, and r=1 for the binary digit values 0 and 1 in the binary plaintext 1100001 of the plaintext a, the binary plaintext 1100010 of the plaintext b, and the binary plaintext 1100100 of the plaintext d exemplified in step (1-1), the above formula of this step is used in calculation so that:

the ciphertext of the encrypted digit 0 is equal to 113;
the ciphertext of the digit 1 is equal to 114.

Therefore, after the binary plaintext 1100001 of the plaintext a is calculated by the above formula, the queried object stored in the ciphertext is:

Enc(a)=(114, 114, 113, 113, 113, 113, 114);

After the binary plaintext 1100010 of the plaintext b is calculated by the above formula, the result of storing in the ciphertext as the queried object is:

Enc(b)=(114,114,113,113,113,114,113).

After the binary plaintext 1100100 of the plaintext d is calculated by the above formula, the result of storing in the ciphertext as the queried object is:

Enc(d)=(114,114,113,113,114,113,113).

For clarity of expression, digits of number systems converted according to characters form a set of ciphertexts and are enclosed in parentheses "H" below. For example, for the plaintext m='abdabd' in the above example, the number of ciphertexts of the queried object acquired after this step is 42:

Enc(abdabd)=([114, 114, 113, 113, 113, 113, 114], [114, 114, 113, 113, 113, 114, 113], [114, 114, 113, 113, 114, 113, 113], [114, 114, 113, 113, 113, 113, 114], [114, 114, 113, 113, 113, 114, 113], [114, 114, 113, 113, 114, 113, 113]).

(2) Receiving a second plaintext which corresponds to a query condition, encrypting the second plaintext using a symmetric-key algorithm or a public-key algorithm to yield a second ciphertext, and storing the second ciphertext as a query object.

The asymmetric encryption or symmetric encryption process in this step is exactly the same as in step (1), which will not be described in detail herein.

This step specifically comprises the following sub-steps.

(2-1) Acquiring the second plaintext corresponding to the query condition, and converting the second plaintext into a fourth plaintext conforming to the numeral system.

This step is exactly the same as the implementation of the above step (1-1).

For example, for the plaintext m'='da' of the character type, first, the plaintext of the character type is converted into an ASCII code; that is, d=100, a=97. Then, the ASCII code is converted into a binary plaintext; that is, d=100=(1100100), a=97=(1100001).

(2-2) Encrypting each digit of the fourth plaintext of the numeral system acquired in (2-1) to yield a second ciphertext combination and storing the second ciphertext combination as the query object.

This step is exactly the same as the implementation of the above step (1-2).

For the plaintext m'='da' in the above example, the query object acquired after this step is: Enc(da)=([114, 114, 113, 113, 114, 113, 113], [114, 114, 113, 113, 113, 113, 114]).

(3) Performing bitwise summation on the queried object acquired in (1) and the query object acquired in (2), according to a numeral system thereof, to acquire a ciphertext query result.

Specifically, (3) comprises: sequentially extracting the same number of ciphertexts as those in the query object from the queried object, performing bitwise summation on the queried object and the query object according to the numeral system until a number of ciphertexts in the queried object is smaller than a number of ciphertexts in the query object, to yield a plurality of summation results, and employing the plurality of summation results as the ciphertext query result.

The number of loops of the ciphertext query result is equal to the number of the queried ciphertexts minus the number of the query ciphertexts plus 1.

For the above example, this step firstly extracts the same number of ciphertexts, that is, [114, 114, 113, 113, 113, 113, 114], [114, 114, 113, 113, 113, 114, 113], as those in the query object Enc(da)=([114, 114, 113, 113, 114, 113, 113], [114, 114, 113, 113, 113, 113, 114]) from the queried object Enc(abdabd)=([114, 114, 113, 113, 113, 113, 114], [114, 114, 113, 113, 113, 114, 113], [114, 114, 113, 113, 114, 113, 113], [114, 114, 113, 113, 113, 113, 114], [114, 114, 113, 113, 113, 114, 113], [114, 114, 113, 113, 114, 113, 113], performs bitwise summation on the ciphertext and the query object; then, the number of ciphertexts having the length corresponding to the next digit in the queried object Enc(Enc(abdabd) is extracted—that is, [114, 113, 113, 113, 113, 114, 114], [114, 113, 113, 113, 114, 113, 114]—and then repeats the above operation until the number of ciphertexts extracted from the last queried object is [114, 114, 113, 113, 113, 114, 113], [114, 114, 113, 113, 114, 113, 113].

For example, the query like function means whether the ciphertext query object Enc(da) of the query condition is contained in the queried object Enc(abdabd) stored in the ciphertext. Since the query condition requires two characters and 14 ciphertexts are converted into a digit, 14 ciphertexts should be extracted from the queried object according to the digit ciphertext each time to perform bitwise summation with 14 ciphertexts of the query object to acquire a set of ciphertext query results. The number of ciphertext query results=the number of ciphertexts of the queried object minus the number of ciphertexts of the query object plus 1=42−14+1=29; that is, there are 29 sets of ciphertext query results in total in this example. Several sets of ciphertext query results are listed below to explain its correctness. The example is as follows:

The first set of ciphertext query results:
Queried object: [114, 114, 113, 113, 113, 113, 114], [114, 114, 113, 113, 113, 114, 113]
Query object: [114, 114, 113, 113, 114, 113, 113], [114, 114, 113, 113, 113, 113, 114]
Ciphertext query results: [228, 228, 226, 226, 227, 226, 227], [228, 228, 226, 226, 226, 227, 227]

The second set of ciphertext query results:
Queried objects: [114, 113, 113, 113, 113, 114, 114], [114, 113, 113, 113, 114, 113, 114]
Query object: [114, 114, 113, 113, 114, 113, 113], [114, 114, 113, 113, 113, 113, 114]
Ciphertext query results: [228, 227, 226, 226, 227, 227, 227], [228, 227, 226, 226, 227, 226, 228]

The third set of ciphertext query results:
Queried objects: [113, 113, 113, 113, 114, 114, 114], [113, 113, 113, 114, 113, 114, 114]
Query object: [114, 114, 113, 113, 114, 113, 113], [114, 114, 113, 113, 113, 113, 114]
Ciphertext query results: [227,227,226,226,228,227,227], [227,227,226,227,226,227,228]
. . .

The 15th set of ciphertext query results:
Queried objects: [114, 114, 113, 113, 114, 113, 113], [114, 114, 113, 113, 113, 113, 114]
Query object: [114, 114, 113, 113, 114, 113, 113], [114, 114, 113, 113, 113, 113, 114]
Ciphertext query results: [228, 228, 226, 226, 228, 226, 226], [228, 228, 226, 226, 226, 226, 228]
. . .

The 29th set of ciphertext query results:
Queried objects: [114, 114, 113, 113, 113, 114, 113], [114, 114, 113, 113, 114, 113, 113]
Query object: [114, 114, 113, 113, 114, 113, 113], [114, 114, 113, 113, 113, 113, 114]
Ciphertext query results:
[228,228,226,226,227,227,226], [228,228,226,226,227,226,227];

It should be noted that, as an alternative embodiment, the bitwise summation in this step may also be replaced by the bitwise subtraction, and the acquired difference is used as the ciphertext query result.

(4) Decrypting the ciphertext query result acquired in (3) to yield a decrypted plaintext, comparing the decrypted plaintext with the second plaintext in (2), and determining whether the decrypted plaintext is the same as the second plaintext. If so, the ciphertext query result is correct, and the query object exists in the queried object; otherwise, determining the ciphertext query result is incorrect, and the query object does not exist in the queried object.

(4) comprises: decrypting the plurality of ciphertext query results to yield the decrypted digits, converting the decrypted digits into a numeral system plaintext, then converting the numeral system plaintext into a character encoding (in this example, the ASCII code), and comparing the acquired character encoding with the second plaintext as the query condition. If the acquired character encoding and the second plaintext are the same, it indicates that the query result is true (that is, the query object exists in the queried object). Otherwise, it indicates that the query result is false (that is, the query object is not included in the queried object).

$$((c \bmod p) \bmod y)/2,$$

Where $y \geq s*2-1$, and $y \leq p/2$. In this example, $y=s*2=4$, c denotes the ciphertext in the ciphertext query result, and its length is the same as the number of ciphertexts in the query object.

If the bitwise subtraction is performed on the ciphertext and the query object according to the ciphertext in (3), (4) should be replaced with:

(4') decrypting the ciphertext query result acquired in (3) to yield a decrypted plaintext, and determining whether the decrypted plaintext is equal to zero. If the plaintext is equal to zero, it indicates that the ciphertext query result is correct, and the query object exists in the queried object; otherwise, it indicates that the ciphertext query result is incorrect, and the query object does not exist in the queried object. At this time, the decryption operation formula of the ciphertext query result acquired by ciphertext bitwise subtraction is:

$$(c \bmod p) \bmod s.$$

It should be understood that the disclosure is not limited to the above formula itself, and any simple deformation or transformation of the formula should fall within the scope of protection of the disclosure.

In the above example, for the first set of ciphertext query results, c is equal to one of the ciphertexts in [228, 228, 226, 226, 227, 226, 227], [228, 228, 226, 226, 226, 227, 227].

For ciphertext 228 (the binary plaintext is taken as an example below), the decryption result=((228 mod 111) mod 4)/2=1.

For ciphertext 226, the decryption result=((226 mod 111) mod 4)/2=0.

For ciphertext 227, the decryption result=((227 mod 111) mod 4)/2=1 (the result thereof is equal to 0.5 and, at this time, equal to 1 by rounding).

For the first set of ciphertext query results, it is (1100101, 1100011).

Then digit conversion is performed, which is equal to 101, 99, and then ASCII conversion is performed so that the corresponding ASCII code is ec.

The first set of ciphertext query results:
Dec ([228,228,226,226,227,226,227],[228,228,226,226, 226,227,227])

The decryption formula of (4) is used to decrypt the ciphertext query result to acquire the plaintext:
m=([1100101],[1100011])=([101],[99])='ec'

The plaintext m='ec' acquired by decrypting the ciphertext query result is compared with the plaintext m='da' of the (2-1) query condition, so the query result is "false."

The second set of ciphertext query results:
Dec ([228,227,226,226,227,227,227], [228,227,226,226, 227,226,228])
The decryption formula of (4) is used to decrypt the ciphertext query result to acquire the plaintext:
m=([1100111],[1100101])=([103],[101])=(ge)
The plaintext m='ge' acquired by decrypting the ciphertext query result is compared with the plaintext m='da' of the (2-1) query condition, so the query result is "false."
The third set of ciphertext query results:
Dec ([227,227,226,226,228,227,227], [227,227,226,227, 226,227,228])
m=([1100111],[1101011])=([103],[107])=(gk)
The plaintext m='gk' acquired by decrypting the ciphertext query result is compared with the plaintext m='da' of the (2-1) query condition, so the query result is "false."
. . .
The 15th set of ciphertext query results:
Dec ([228,228,226,226,228,226,226],[228,228,226,226, 226,226,228])
m=[1100100],[1100001]=([100],[97])=(da)
The plaintext m='da' acquired by decrypting the ciphertext query result is compared with the plaintext m='da' of the (2-1) query condition, so the query result is "true."
. . .
The 29th set of ciphertext query results:
Dec ([228,228,226,226,227,227,226],[228,228,226,226, 227,226,227])
The decryption formula of (4) is used to decrypt the ciphertext query result to acquire the plaintext:
m=([1100110],[1100101])=([102],[101])=(fe)
The plaintext m='fe' acquired by decrypting the ciphertext query result is compared with the plaintext m='da' of the query condition of (2-1), so the query result is "false."
According to the above example, an example that is not listed can be explained, and all the query results thereof are "false."
The ciphertext query result acquired by the equal (=) query function is as follows. First, the ciphertext query result is decrypted, and then the plaintext of the decrypted result is compared with the plaintext of the (2-1) query condition. If the results are equal, the query result is "true." Otherwise the query result is "false."
The ciphertext query result of the equal function:
Dec ([228,228,226,226,227,226,227],[228,228,226,226, 226,227,227], [114,114,113,113,114,113,113],[114,114,113, 113,113,113,114],[114,114,113,113,113,114, 113],[114,114, 113,113,114,113,113])
m=([1100101], [1100011], [1100100], [1100001], [1100010], [1100100])=(ecdabd)
The plaintext m='ecdabd' acquired by decrypting the ciphertext query result is compared with the plaintext m='da' of the (2–1) query condition, so the query result is "false."
The ciphertext query result acquired by the unequal (< >) query function is the same as the ciphertext query result to the equal function, so the query result is "true."
The base 512 (i.e., s=512) is exemplified as follows.
(1) The plaintext of any data type is acquired, the plaintext is encrypted, and the result of the encryption processing is stored as a queried object in a ciphertext.
For example, assuming that the work key p=11111, q=11, $x_0$=p*q=122221, and r=1, for the plaintext m='abdabd', the value of the ASCII code of the digit plaintext character a is equal to 97, the value of b is equal to 98, and the value of d is equal to 100. The above formula of the disclosure is used in calculation so that:

the ciphertext of the encrypted character a is equal to 11720;
the ciphertext of the encrypted character b is equal to 11721;
the ciphertext of the encrypted character d is equal to 11723.
Therefore, the number of ciphertexts of the queried object is six:
Enc(abdabd)=(11720,11721,11723,11720,11721,11723)
(2) The query condition is input.
(2-1) The plaintext of the query condition is converted into the plaintext, for example.
For example, for the plaintext m='da' of the character type, the value of the ASCII code of the digit plaintext character d is equal to 100, and the value of a is equal to 97.
(2-2) The respective number of the plaintext digit acquired in (2-1) is encrypted using the fully homomorphic encryption algorithm, and the encrypted result is combined into a ciphertext combination as the query object, in which the encryption operation is the same as the formula in (1-2), that is, the number of ciphertexts of the query object is 2:
Enc(da)=(11723,11720)
(3) Ciphertext bitwise summation is performed on the queried object and the query object according to a numeral system thereof, and the ciphertext of the summed result is combined into the ciphertext query result.
For example, the query like function means whether the ciphertext query object Enc(da) of the query condition is contained in the queried object Enc(abdabd) stored in the ciphertext. Since the query condition requires two characters and 2 ciphertexts are converted into a digit, 2 ciphertexts should be extracted from the queried object according to the digit ciphertext each time to perform bitwise summation with 2 ciphertexts of the query object to acquire a set of ciphertext query results. The number of ciphertext query results=the number of ciphertexts of the queried object minus the number of ciphertexts of the query object plus 1=6-2+1=5, that is, there are 5 sets of the ciphertext query results in total in this example as follows:
The first set of ciphertext query results:
Queried object: (11720, 11721)
Query object: (11723,11720)
Ciphertext query result: (23443, 23441)
The second set of ciphertext query results:
Queried object: (11721,11723)
Query object: (11723,11720)
Ciphertext query result: (23444, 23443)
The third set of ciphertext query results:
Queried object: (11723, 11720)
Query object: (11723,11720)
Ciphertext query result: (23446, 23440)
The fourth set of ciphertext query results:
Queried object: (11720, 11721)
Query object: (11723,11720)
Ciphertext query result: (23443, 23441)
The fifth set of ciphertext query results:
Queried object: (11721,11723)
Query object: (11723,11720)
Ciphertext query result: (23444, 23443)
The query equal (=) function means whether the ciphertext query object Enc(da) of the query condition is equal to the queried object Enc(abdabd) stored in the ciphertext. Since the query condition requires two characters and there are 2 digit ciphertexts while 6 objects Enc(abcabc) stored in the ciphertext are subjected to ciphertext bitwise summation according to a numeral system thereof, a set of ciphertext query results may be acquired. The ciphertext query result in this example is as follows:

Queried object: (11720, 11721, 11723, 11720, 11721, 11723)

Query object: (11723,11720)

Ciphertext query result: (23443, 23441, 11723, 11720, 11721, 11723)

The query unequal (< >) function means whether the ciphertext query object Enc(da) of the query condition is equal to the queried object Enc(abdabd) stored in the ciphertext. In this example, the ciphertext query result is the same as the query result of the equal function. The difference between the equal function and the unequal function is further described in the next step (4).

(4) The user with the query authority and the authority of decrypting the query result can decrypt the ciphertext query result. That is, the decrypted ciphertext query result is a plaintext, which is compared with the plaintext of the (2-1) query condition. If they are equal to each other, it indicates that the query result is "true." Otherwise, the query result is "false," for example.

The ciphertext query result acquired by the like query function is as follows. First, the ciphertext query result is decrypted, and then the plaintext of the decrypted result is compared with the plaintext of the (2-1) query condition. If the results are equal, the query result is "true." Otherwise the query result is "false."

The first set of ciphertext query results:
Dec (23443,23441)

The decryption formula of (4) is used to decrypt the ciphertext query result to acquire the plaintext:
m=(99,98)='cb'

The plaintext m='cb' acquired by decrypting the ciphertext query result is compared with the plaintext m='da' of the query condition (2-1), so the query result is "false."

The second set of ciphertext query results:
Dec (23444, 23443)

The decryption formula of (4) is used to decrypt the ciphertext query result to acquire the plaintext:
m=(99,99)='cc'

The plaintext m='cc' acquired by decrypting the ciphertext query result is compared with the plaintext m='da' of the (2-1) query condition, so the query result is "false."

The third set of ciphertext query results:
Dec (23446,23440)
m=(100,97)='da'

The plaintext m='da' acquired by decrypting the ciphertext query result is compared with the plaintext m='da' of the (2-1) query condition, so the query result is "true."

The fourth set of ciphertext query results:
Dec (23443,23441)

The decryption formula of (4) is used to decrypt the ciphertext query result to acquire the plaintext:
m=(99,98)='cb'

The plaintext m='cb' acquired by decrypting the ciphertext query result is compared with the plaintext m='da' of the query condition (2-1), so the query result is "false."

The fifth set of ciphertext query results:
Dec (23444, 23443)

The decryption formula of (4) is used to decrypt the ciphertext query result to acquire the plaintext:
m=(99,99)='cc'

The plaintext m='cc' acquired by decrypting the ciphertext query result is compared with the plaintext m='da' of the (2-1) query condition, so the query result is "false."

The ciphertext query result acquired by the equal (=) query function is as follows. First, the ciphertext query result is decrypted, and then the plaintext of the decrypted result is compared with the plaintext of the (2-1) query condition. If the results are equal, the query result is "true." Otherwise, the query result is "false."

The ciphertext query result of the equal function is:
Dec (23443,23441,11723,11720,11721,11723)
m=(99,98,100,97,98,100)=(cbdabd)

The plaintext m='cbdabd' acquired by decrypting the ciphertext query result is compared with the plaintext m='da' of the (2-1) query condition, so the query result is "false."

The ciphertext query result acquired by the unequal (< >) query function is the same as the ciphertext query result of the equal function, so the query result is "true."

For all the examples mentioned in the above steps, since the decryption process and result of the like, equal (=), and unequal (< >) functions are described in detail in the above step (4), the decryption process and result will not be separately described in detail in this step.

Figure 2:
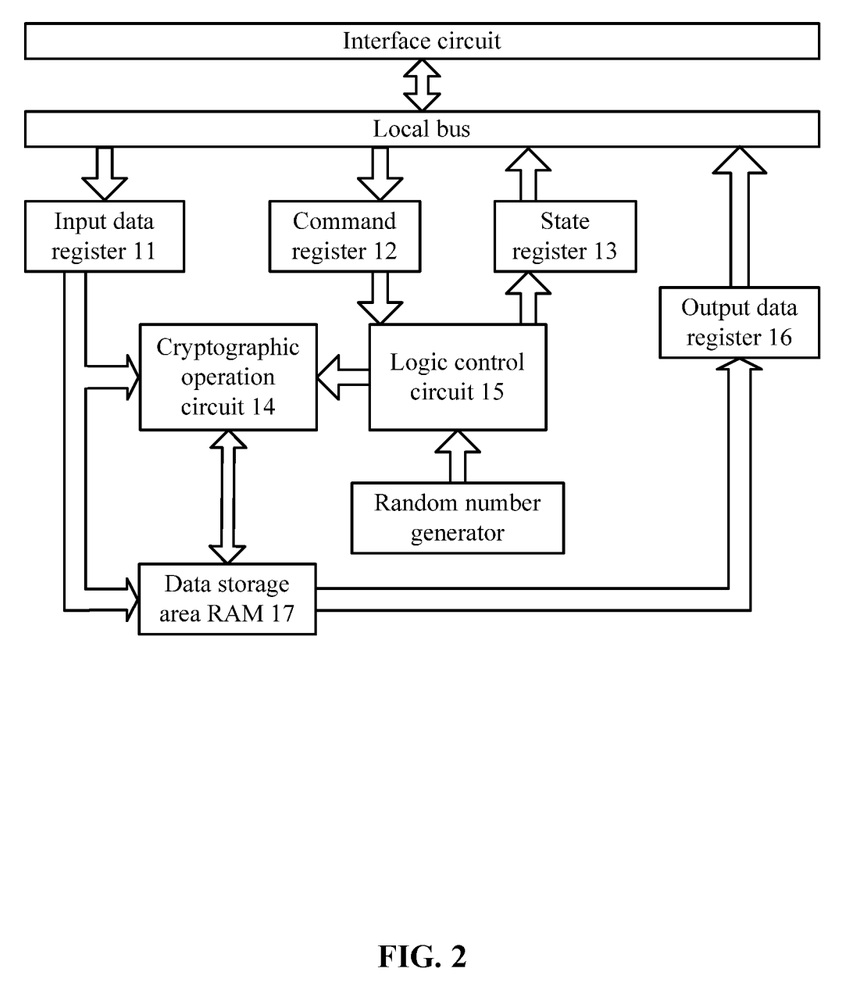
FIG. 2 is a schematic block diagram illustrating a fully homomorphic encrypted circuit implementing the fully homomorphic encrypted ciphertext query method as described herein.

The fully homomorphic encrypted ciphertext query method of the disclosure may be implemented by a fully homomorphic encrypted circuit, which is an In-System Flash FPGA (simply referred to as ISF FPGA).

As shown in FIG. 2, the fully homomorphic encrypted circuit 1 comprises an input data register 11, a command register 12, a status register 13, a cryptographic operation circuit 14, a logic control circuit 15, an output data register 16, and a data storage area RAM 17.

The input data register 11 is configured to acquire the processed data and private data, transmit the processed data to the cryptographic operation circuit 14, and store the private data in the data storage area RAM 17 for use by the cryptographic operation circuit 14.

The cryptographic operation circuit 14 is configured to acquire the private data from the data storage area RAM 17.

The command register 12 is configured to acquire a user command from the local bus and transmit the user command to the logic control circuit 15.

The logic control circuit 15 is configured to control the cryptographic operation circuit 14, execute the encryption and decryption function and the ciphertext operation function of the data according to the user command, and transmit the result of execution to the status register 13, and the random number used in the encryption process is generated by a random number generator.

The status register 13 is configured to acquire the result of execution from the logic control circuit 15 and communicate the result of execution to an interface circuit via the local bus.

The data storage area RAM 17 is configured to communicate the data processed by the cryptographic operation circuit 14 to the output data register 16.

The output data register 16 is configured to receive the data from the data storage area RAM 17 and transmits it to the local bus.

The above fully homomorphic encrypted circuit realizes encryption and decryption of positive and negative integers and various types of real numbers, and can fulfill various functions such as an arithmetic operation, a relationship comparison operation, and a logic operation in the ciphertext state so as to protect user information; in addition, the above fully homomorphic encrypted circuit performs data calculation processing directly on the ciphertext data in the ciphertext state. The technology can provide data processing parties with analysis and mining of ciphertext data, and business opportunities for storing massive data. Therefore, the cloud computing service provider can accept the commission from a data owner to safely and fully analyze and process the data without exposing the original data.

It will be obvious to those skilled in the art that changes and modifications may be made, and therefore, the aim in the appended claims is to cover all such changes and modifications.

What is claimed is:

1. A method, comprising:
(1) acquiring a first plaintext, encrypting the first plaintext using a symmetric-key algorithm or a public-key algorithm to yield a first ciphertext, and storing the first ciphertext as a queried object; wherein:
when the symmetric-key algorithm is employed, the following formula is used: $c=(m+s*r+p*q) \mod x_0$, wherein c denotes a ciphertext, m denotes a digit of a plaintext conforming to a numeral system, s denotes a base of the numeral system, r denotes a random number, p denotes an encryption key, and $x_0$ denotes an intermediate variable equal to a product of the encryption key p and another encryption key q, both p and q are odd numbers, and the encryption keys are not publicly disclosed; and
when the public-key algorithm is employed, the following formula is used: $c=(m+s*r+s*\Sum_1^\tau x_i*r) \mod x_0$, wherein c denotes a ciphertext, m denotes a digit of a plaintext conforming to a numeral system, s denotes a base of the numeral system, both r and τ denote random numbers, $x_i$ denotes a randomly generated ith number, $x_i=q_i*p+s*r$, p denotes a private key and is an odd number, and $q_i<<q_0$, $0 \le i \le \tau$, a public key is denoted as $pk=(x_0, x_1, \ldots, x_i, \ldots, x_\tau)$, and the private key p is generated based on Learning With Errors (LWE), a lattice, or Approximate Greatest Common Divisor (GCD) and sparse subset sum problem (SSSP);
(2) receiving a second plaintext which corresponds to a query condition, encrypting the second plaintext using the symmetric-key algorithm or the public-key algorithm to yield a second ciphertext, and storing the second ciphertext as a query object;
(3) performing bitwise summation on the queried object acquired in (1) and the query object acquired in (2) according to a numeral system thereof, to acquire a ciphertext query result; and
(4) decrypting the ciphertext query result acquired in (3) to yield a decrypted plaintext, and comparing the decrypted plaintext with the second plaintext in (2), determining, if the decrypted plaintext is the same as the second plaintext, the ciphertext query result is correct, and the query object exists in the queried object; otherwise, determining the ciphertext query result is incorrect, and the query object does not exist in the queried object.

2. The method of claim 1, wherein (1) comprises:
(1-1) acquiring the first plaintext, and converting the first plaintext into a third plaintext conforming to the numeral system; and
(1-2) encrypting each digit of the third plaintext of the numeral system acquired in (1-1), to yield a first ciphertext combination, and storing the first ciphertext combination as the queried object.

3. The method of claim 2, wherein (2) comprises:
(2-1) acquiring the second plaintext corresponding to the query condition, and converting the second plaintext into a fourth plaintext conforming to the numeral system; and
(2-2) encrypting each digit of the fourth plaintext of the numeral system acquired in (2-1), to yield a second ciphertext combination, and storing the second ciphertext combination as the query object.

4. The method of claim 3, wherein converting the first/second plaintext into the third/fourth plaintext conforming to the numeral system comprises: converting the first/second plaintext of a character type into a character encoding, and converting the character encoding into the third/fourth plaintext conforming to the numeral system.

5. The method of claim 1, wherein
(3) comprises: sequentially extracting the same number of ciphertexts as those in the query object from the queried object, performing bitwise summation on the queried object and the query object according to the numeral system until a number of ciphertexts in the queried object is smaller than a number of ciphertexts in the query object, to yield a plurality of summation results, and employing the plurality of summation results as the ciphertext query result; and
(4) comprises: decrypting the plurality of ciphertext query results to yield the decrypted digits, converting the decrypted digits into a numeral system plaintext, then converting the numeral system plaintext into a character encoding, and comparing the acquired character encoding with the second plaintext as the query condition, if the acquired character encoding and the second plaintext are the same, it indicates that the query result is true, otherwise it indicates that the query result is false, the character encoding being ASCII encoding or Unicode encoding.

6. The method of claim 5, wherein:
a decryption operation formula of the ciphertext query result acquired by bitwise summation is:
$((c \mod p) \mod y)/2$,
where $y \ge *2-1$, and $y \le p/2$.

7. A circuit performing the method of claim 1, comprising an input data register, a command register, a status register, a cryptographic operation circuit, a logic control circuit, an output data register, and a data storage area RAM;
wherein:
the input data register is configured to acquire the processed data and private data, transmit the processed data to the cryptographic operation circuit, and store the private data in the data storage area RAM for use by the cryptographic operation circuit;
the cryptographic operation circuit is configured to acquire the private data from the data storage area RAM;
the command register is configured to acquire a user command from a local bus and transmit the user command to the logic control circuit;
the logic control circuit is configured to control the cryptographic operation circuit to execute the encryption and decryption function and the ciphertext operation function of the data according to the user command, and transmit the result of execution to the status register, and the random number used in the encryption process is generated by a random number generator;

the status register is configured to acquire the result of execution from the logic control circuit and communicate the result of execution to an interface circuit via the local bus;

the data storage area RAM is configured to communicate the data processed by the cryptographic operation circuit to the output data register; and the output data register is configured to receive the data from the data storage area RAM and transmits the data to the local bus.

8. A method, comprising:

(1) acquiring a first plaintext, encrypting the first plaintext using a symmetric-key algorithm or a public-key algorithm to yield a first ciphertext, and storing the first ciphertext as a queried object; wherein:

when the symmetric-key algorithm is employed, the following formula is used: $c=(m+s*r+p*q) \mod x_0$, wherein c denotes a ciphertext, m denotes a digit of a plaintext conforming to a numeral system, s denotes a base of the numeral system, r denotes a random number, p denotes an encryption key, and $x_0$ denotes an intermediate variable equal to a product of the encryption key p and another encryption key q, both p and q are odd numbers, and the encryption keys are not publicly disclosed; and when the public-key algorithm is employed, the following formula is used: $c=(m+s*r+s*\Sigma_1^\tau x_i *r) \mod x_0$, wherein c denotes a ciphertext, m denotes a digit of a plaintext conforming to a numeral system, s denotes a base of the numeral system, both r and τ denote random numbers, $x_i$ denotes a randomly generated ith number, $x_i=q_i*p+s*r$, p denotes a private key and is an odd number, and $q_i<<q_0$, $0 \le i \le \tau$, a public key is denoted as $pk=(x_0, x_1, \ldots, x_i, \ldots, x_\tau)$, and the private key p is generated based on Learning With Errors (LWE), a lattice, or Approximate Greatest Common Divisor (GCD) and sparse subset sum problem (SSSP);

(2) receiving a second plaintext which corresponds to a query condition, encrypting the second plaintext using the symmetric-key algorithm or the public-key algorithm to yield a second ciphertext, and storing the second ciphertext as a query object;

(3) performing bitwise subtraction on the queried object acquired in (1) and the query object acquired in (2) according to a numeral system thereof, to yield a difference, and using the difference as a ciphertext query result; and (4) decrypting the ciphertext query result acquired in (3) to yield a decrypted plaintext, and determining whether the decrypted plaintext is equal to zero, if the plaintext is equal to zero, it indicates that the ciphertext query result is correct, and the query object exists in the queried object; otherwise, it indicates that the ciphertext query result is incorrect, and the query object does not exist in the queried object.

9. The method of claim 8, wherein (1) comprises:

(1-1) acquiring the first plaintext, and converting the first plaintext into a third plaintext conforming to the numeral system; and (1-2) encrypting each digit of the third plaintext of the numeral system acquired in (1-1), to yield a first ciphertext combination, and storing the first ciphertext combination as the queried object.

10. The method of claim 9, wherein (2) comprises:

(2-1) acquiring the second plaintext corresponding to the query condition, and converting the second plaintext into a fourth plaintext conforming to the numeral system; and (2-2) encrypting each digit of the fourth plaintext of the numeral system acquired in (2-1), to yield a second ciphertext combination, and storing the second ciphertext combination as the query object.

11. The method of claim 10, wherein converting the first/second plaintext into the third/fourth plaintext conforming to the numeral system comprises: converting the first/second plaintext of a character type into a character encoding, and converting the character encoding into the third/fourth plaintext conforming to the numeral system.

12. The method of claim 8, wherein (3) comprises: sequentially extracting the same number of ciphertexts as those in the query object from the queried object, performing bitwise subtraction on the queried object and the query object according to the numeral system until a number of ciphertexts in the queried object is smaller than a number of ciphertexts in the query object, to yield a plurality of subtraction results, and employing the plurality of subtraction results as the ciphertext query result; and (4) comprises: decrypting the plurality of ciphertext query results to yield the decrypted digits, converting the decrypted digits into a numeral system plaintext, then converting the numeral system plaintext into a character encoding, and comparing the acquired character encoding with zero, if the acquired character encoding and zero are the same, it indicates that the query result is true, otherwise it indicates that the query result is false, the character encoding being ASCII encoding or Unicode encoding.

13. The method of claim 12, wherein:

a decryption operation formula of the ciphertext query result acquired by bitwise subtraction is:

(c mod p) mod s.

14. A system, comprising:

a first module configured to acquire a first plaintext of any data type, encrypt the first plaintext using a symmetric-key algorithm or a public-key algorithm to yield a first ciphertext, and store the first ciphertext as a queried object; wherein:

when the symmetric-key algorithm is employed, the following formula is used: $c=(m+s*r+p*g) \mod x_0$, wherein c denotes a ciphertext, m denotes a digit of a plaintext conforming to a numeral system, s denotes a base of the numeral system, r denotes a random number, p denotes an encryption key, and $x_0$ denotes an intermediate variable equal to a product of the encryption key p and another encryption key q, both p and q are odd numbers, and the encryption keys are not publicly disclosed; and when the public-key algorithm is employed, the following formula is used: $c=(m+s*r+s*\Sigma_1^\tau x_i *r) \mod x_0$, wherein c denotes a ciphertext, m denotes a digit of a plaintext conforming to a numeral system, s denotes a base of the numeral system, both r and r denote random numbers, $x_i$ denotes a randomly generated ith number, $x_i=q_i*p+s*r$, p denotes a private key and is an odd number, and $q_i<<q_0$, $0 \le i \le \tau$, a public key is denoted as $pk=(x_0, x_1, \ldots, x_i, \ldots, x_\tau)$, and the private key p is generated based on Learning With Errors (LWE), a lattice, or Approximate Greatest Common Divisor (GCD) and sparse subset sum problem (SSSP);

a second module configured to receive a second plaintext which corresponds to a query condition, encrypt the second plaintext using the symmetric-key algorithm or the public-key algorithm to yield a second ciphertext, and store the second ciphertext as a query object;

a third module configured to perform bitwise summation on the queried object acquired by the first module and the query object acquired by the second module according to a numeral system thereof, to acquire a ciphertext query result; and a fourth module configured to decrypt the ciphertext query result acquired by the third module to yield a decrypted plaintext, compare the decrypted plaintext with the second plaintext acquired by the second module, and determine, if the decrypted plaintext is the same as the second plaintext, the ciphertext query result is correct, and the query object exists in the queried object; otherwise, determine the ciphertext query result is incorrect, and the query object does not exist in the queried object.

15. A system, comprising:

a first module configured to acquire a first plaintext of any data type, encrypt the first plaintext using a symmetric-key algorithm or a public-key algorithm to yield a first ciphertext, and store the first ciphertext as a queried object; wherein:

when the symmetric-key algorithm is employed, the following formula is used: $c=(m+s*r+p*q) \mod x_0$, wherein c denotes a ciphertext, m denotes a digit of a plaintext conforming to a numeral system, s denotes a base of the numeral system, r denotes a random number, p denotes an encryption key, and $x_0$ denotes an intermediate variable equal to a product of the encryption key p and another encryption key q, both p and q are odd numbers, and the encryption keys are not publicly disclosed; and when the public-key algorithm is employed, the following formula is used: $c=(m+s*r+s*\Sigma_1^\tau x_i*r) \mod x_0$, wherein c denotes a ciphertext, m denotes a digit of a plaintext conforming to a numeral system, s denotes a base of the numeral system, both r and $\tau$ denote random numbers, $x_i$ denotes a randomly generated ith number, $x_i=q_i*p+s*r$, p denotes a private key and is an odd number, and $q_i \ll q_0$, $0 \leq i \leq \tau$, a public key is denoted as $pk=(x_0, x_1, \ldots, x_i, \ldots, x_\tau)$, and the private key p is generated based on Learning With Errors (LWE), a lattice, or Approximate Greatest Common Divisor (GCD) and sparse subset sum problem (SSSP);

a second module configured to receive a second plaintext which corresponds to a query condition, encrypt the second plaintext using the symmetric-key algorithm or the public-key algorithm to yield a second ciphertext, and store the second ciphertext as a query object;

a third module configured to perform bitwise subtraction on the queried object acquired by the first module and the query object acquired by the second module according to a numeral system thereof, to yield a difference, and use the difference as a ciphertext query result; and a fourth module configured to decrypt the ciphertext query result acquired by the third module to yield a decrypted plaintext, and determine whether the decrypted plaintext is equal to zero, if the plaintext is equal to zero, it indicates that the ciphertext query result is correct, and the query object exists in the queried object; otherwise, it indicates that the ciphertext query result is incorrect, and the query object does not exist in the queried object.

* * * * *